(12) United States Patent
Bezemer

(10) Patent No.: US 7,112,034 B2
(45) Date of Patent: Sep. 26, 2006

(54) WIND TURBINE ASSEMBLY

(75) Inventor: Daryle Bezemer, Box 811, Souris, Manitoba (CA) R0K 2C0

(73) Assignees: Daryle Bezemer, Souris (CA); Robert Garry Raymond Mazer, Brandon (CA)

( * ) Notice: Subject to any disclaimer, the term of this patent is extended or adjusted under 35 U.S.C. 154(b) by 52 days.

(21) Appl. No.: 10/888,085

(22) Filed: Jul. 12, 2004

(65) Prior Publication Data

US 2005/0019151 A1    Jan. 27, 2005

Related U.S. Application Data

(60) Provisional application No. 60/485,720, filed on Jul. 10, 2003.

(51) Int. Cl.
*F03B 1/00* (2006.01)

(52) U.S. Cl. ............... 415/3.1; 415/4.2; 416/197 A
(58) Field of Classification Search ............ 415/4.2, 415/3.1, 4.4, 907, 191, 211.1, 203; 416/197 A; 290/44, 55
See application file for complete search history.

(56) References Cited

U.S. PATENT DOCUMENTS

| | | | | | |
|---|---|---|---|---|---|
| 1,312,021 | A | * | 8/1919 | Dickinson et al. | 290/55 |
| 1,315,595 | A | * | 9/1919 | Clark | 415/4.4 |
| 4,279,569 | A | * | 7/1981 | Harloff | 415/53.3 |
| 4,350,900 | A | * | 9/1982 | Baughman | 290/55 |
| 5,083,899 | A | * | 1/1992 | Koch | 415/2.1 |
| 6,158,953 | A | * | 12/2000 | Lamont | 415/4.4 |
| 6,655,907 | B1 | * | 12/2003 | Brock et al. | 415/4.2 |

* cited by examiner

*Primary Examiner*—Igor Kershteyn
(74) *Attorney, Agent, or Firm*—Ryan W. Dupuis; Michael R. Williams; Adrian D. Battison

(57) ABSTRACT

A wind turbine assembly includes a venturi passage and a rotor in proximity thereto for rotation about an axis lying substantially perpendicular to the venturi passage. A rotor chamber partially surrounds the rotor. A port communicates between the rotor chamber and a low pressure point of the venturi passage. A remaining exposed portion of rotor is rotated by wind forces pushing the rotor. Communication of the rotor chamber with the venturi passage reduces pressure in the rotor chamber to increase efficiency of the wind forces pushing on the rotor blades.

20 Claims, 12 Drawing Sheets

WIND TURBINE ASSEMBLY

CLAIM TO DOMESTIC PRIORITY

This Application claims Domestic Priority to Provisional Application No. 60/485,720 filed Jul. 10, 2003 incorporated by reference.

FIELD OF THE INVENTION

The present invention relates to a wind turbine assembly for generating usable power when positioned in a wind current.

BACKGROUND

The use of wind turbines are well known for capturing energy from the wind. Known designs typically involve blades which rotate about a rotor axis parallel to the wind direction. These designs have numerous inefficiencies and can be too noisy for use on residential properties.

SUMMARY

According to one aspect of the present invention there is provided a wind turbine assembly comprising:

a venturi passage extending in a flow direction from a front opening at a front of the assembly to a rear opening at a rear of the assembly;

a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;

a peripheral wall which extends at least 180 degrees about the rotor in a generally circumferential direction from the front of the assembly at an outer periphery of the sweep area towards the rear of the assembly to partially surround and define an enclosed portion of the sweep area; and a through port communicating through the peripheral wall of the housing between the enclosed portion of the sweep area near the front of the assembly and the venturi passage.

The peripheral wall partially surrounding a rotor which is rotatable about an axis perpendicular to the wind direction in combination with communication of the rotor with a venturi passage results in an efficient and low noise wind turbine design which overcomes disadvantages of known prior designs.

Each blade preferably spans outwardly generally parallel to the shaft from a trailing side attached to the shaft to a leading side at a free edge of the blade spaced from the shaft and each blade has a profile between leading and trailing sides which is generally in the shape of an airfoil.

Preferably each blade remains in a fixed position in relation to the shaft, oriented such that substantially a complete surface of the blade remains perpendicular to a circumferential flow direction about the shaft as the rotor is rotated.

Each blade may include a leading face facing into a direction of rotation of the rotor and a trailing face opposite the leading face, the leading and trailing faces of each blade preferably being identically shaped to the respective leading and trailing faces of the other blades.

The peripheral wall may have a circumference which is larger than a circumference of the rotor, defining a space therebetween. In this instance, the shaft of the rotor may be spaced towards the front of the assembly from a radial centre of the peripheral wall so that the space defined between the rotor and the peripheral wall progressively gets smaller in the direction of rotation towards the front of the assembly.

The enclosed portion of the sweep area is preferably bound at opposing ends by end walls having a close tolerance with respective ends of the blades. The end walls may terminate at a respective edge extending in the flow direction from the shaft of the rotor to the front of the assembly and the end walls span greater than 180 degrees about the shaft.

Preferably there is provided a close tolerance between the peripheral wall and a free edge of an exiting one of the blades at the front of the assembly.

An exposed portion of the sweep area diametrically opposite the peripheral wall is preferably open and exposed to wind currents blowing past the assembly.

The venturi passage may be defined between confronting airfoil surfaces of respective airfoil assemblies.

One of the airfoil assemblies may be equal in curvature on both surfaces spanning between a leading edge and a trailing edge thereof, in which the leading edge is widest for facing into the wind, said one of the airfoil assemblies supporting the rotor therein.

The through port preferably communicates with the venturi passage at a point of lowest pressure created by an air stream being accelerated as it passes through the venturi passage.

There may be provided one or more ducts, each including an inlet facing into the flow direction and an outlet directed into the enclosed portion of the sweep area.

The outlet of each duct is preferably directed at a trailing face of an exiting one of the blades of the rotor adjacent a free edge of said exiting one of the blades. The duct also preferably tapers progressively smaller from the inlet to the outlet.

There may be provided a governor supported in proximity to the rotor diametrically opposite the peripheral wall for controlling flow of air directed into the rotor.

The governor is preferably movable between a closed position in which the rotor is enclosed and shielded from the wind and an open position in which wind is redirected down into the enclosed portion of the sweep area at the rear of the assembly.

The venturi passage may be defined by vertically arranged airfoils supporting the rotor thereabove. Alternatively, the venturi passage may be defined by horizontally arranged airfoils.

There is provided a direction mechanism for orienting the front of the assembly to face into a direction of the wind.

The rotor that is attached to the output shaft, which provides means of support for the rotor blades, preferably transfers wind energy to the shaft in a rotational force.

The rotor may be made of steel or other material having similar characteristics to provide strength and also high inertia to stabilize rotor speeds during wind speed fluctuations.

The rotor blades may be fixed to the rotor equally around its circumference at 45-degree intervals.

The blades are preferably symmetrical to each other so that as each blade exits the rotor chamber, the airfoil shape is always facing outward from the rotor chamber to provide lift on the exiting rotor blade and push on the previously exiting rotor blade.

The rotor blades may be mounted on the rotor using additional gussets to support the blade and transfer the wind energy to the rotor shaft in a rotational force.

The rotor shaft preferably has two outputs, one on each side of the rotor that provides means to drive generators, pumps or other mechanical equipment.

The rotor may be supported horizontally in a rotor chamber by means of support bearings on both sides of the rotor output shaft. Alternatively, one or more rotors may be provided for rotation about respective vertical axes by support bearings as well.

The upper airfoil assembly may be positioned horizontally and fixed in its center to the support structure of a horizontal venturi design or to the support tower of a vertical venturi design.

The upper airfoil preferably serves as an enclosure to house generating equipment, gearboxes, pumps or other mechanical devices.

The lower airfoil assembly is preferably inverted in relation to the upper airfoil to create the venturi tube. The lower airfoil is positioned to provide the most acceleration of the air stream as it passes therethrough.

Both the upper and lower airfoils may be supported, and further enclosed by an outer rudder on each side of the structure, the rudders being made in an aerodynamic shape to provide additional stability and to direct the turbine into the wind stream.

The venturi port is preferably made of smooth, easily molded material, such as plastic or other composite materials.

The venturi port preferably provides a smooth transition of airflow as the air stream changes direction as it passes through the assembly.

The governor may pivot on a fulcrum located behind the rotor chamber.

Preferably, the governor extends above the rotor chamber and curves gradually toward the front of the assembly.

The governor may have a ridged support frame covered with plastic or a composite material that allows the wind stream to flow easily over it.

A linear actuator preferably attaches above the governor fulcrum to control displacement of the governor between the open and closed positions in which a rod end of the actuator attaches to a pivot point on the governor itself.

The linear actuator is preferably selected from a group of actuators comprising electric, hydraulic or pneumatic actuators.

The linear actuator may be controlled manually, from a remote location, or by programmable logic control.

The vertically arranged airfoils may include outer airfoils running vertically on the outsides of the structure which are supported at the top by the upper airfoil structure and are supported at the bottom of the structure by lower supports that extend outward from the support tower.

The venturi tube may be defined between upper and lower airfoils wherein the upper airfoil forms a smooth transition to the outer airfoils in an aerodynamic shape.

The lower supports are preferably also aerodynamic in shape to allow the wind stream to pass smoothly through the machine.

The distance between the inner airfoil arrangement and the outer airfoil is relevant to the size of the rotor chamber arrangement so that the venturi creates a negative pressure in the venturi port and the venturi duct.

Preferably, the venturi ports extrude on each side of the inner airfoil at the point of lowest pressure on the airfoils surface that is created by the accelerated air steam.

In one embodiment, the assembly may comprise part of a coastal generating station using a horizontal venturi design in which the rotor is positioned below the venturi tube and governing is achieved by blocking the air stream before it reaches the rotor, or by restricting the airflow through the venturi and frontal ports.

BRIEF DESCRIPTION OF THE DRAWINGS

In the accompanying drawings, which illustrate exemplary embodiments of the present invention.

DETAILED DESCRIPTION

Figure 1:
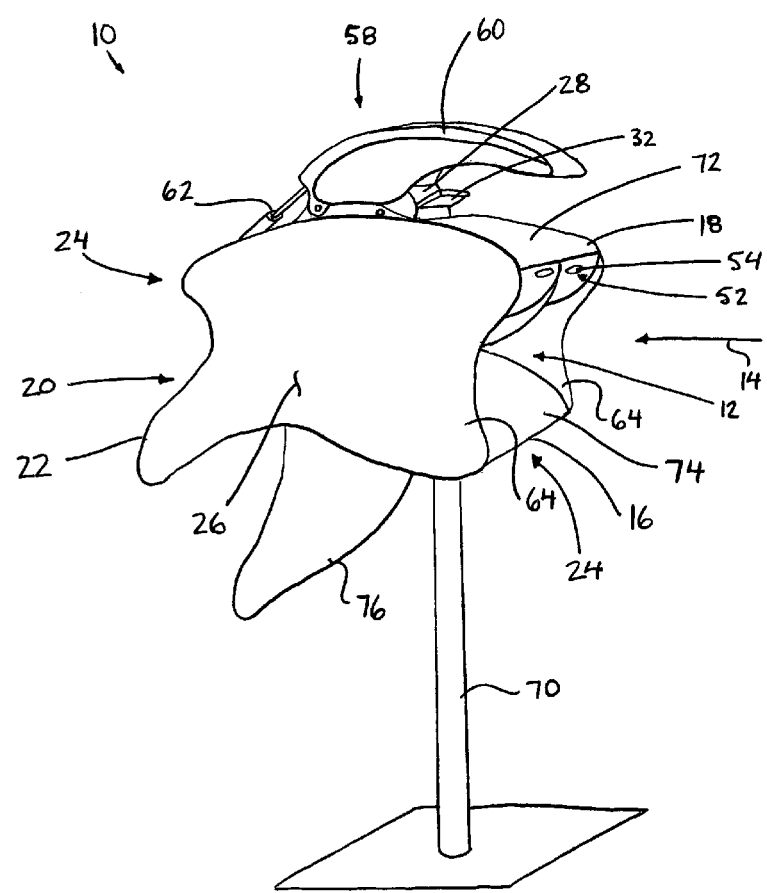
FIG. 1 is a perspective view of a first embodiment of the wind turbine assembly.

Referring to the accompanying drawings, there is illustrated a wind turbine assembly generally indicated by reference numeral 10. Various embodiments of the assembly 10 are illustrated in which like reference numerals on the different figures and varying embodiments indicate similar parts. The common features of the various embodiments will first be described herein.

The assembly 10 includes one or more venturi passages 12 which extend in a flow direction 14 from a front opening 16 at a front 18 of the assembly to a rear opening 20 at a rear 22 of the assembly. Each venturi passage 12 is defined by a pair of spaced apart and confronting elongate airfoil surfaces of respective airfoil assemblies 24. Cross-sectional area of the passage is initially reduce and is then enlarged again as the wind passes in the flow direction from the front opening to the rear opening.

The airfoils are supported by a surrounding housing 26 which also support a rotor 28 therein. The rotor 28 is supported for rotation about a longitudinal axis thereof which is oriented perpendicular to the flow direction in proximity to the venturi passage 12. The rotor includes a shaft 30 supporting a plurality of blades 32 fixed in orientation thereon.

Each blade 32 of the rotor comprises a panel extending radially outward from the shaft so as to be oriented perpendicularly to a circumferential flow direction about the shaft. Each of the blades has a profile in cross-section between a leading side at the free edge 34 spaced outwardly from the shaft to a trailing side mounted on the shaft. Each of the blades includes a leading face 36 and an opposing substantially parallel trailing face 38 which are perpendicular to the circumferential direction. The leading face and the trailing face of each blade are identical in shape to those of the remaining blades. A gusset 40 is formed between the leading face 36 and the shaft for additional support against wind forces. The blades define a cylindrical sweep area about the shaft which is occupied by the blades as the blades are rotated.

The shaft 30 of the rotor is supported on the housing by suitable bearings 42 supporting opposing ends of the shaft which in turn support the shaft on the housing. A power output is thus defined at each end of the shaft for connection to suitable devices to be driven by rotation of the rotor.

The housing further includes a rotor chamber 44 which receives the rotor rotatably therein. The chamber has a peripheral wall 46 which extend circumferentially at least 180 degrees about the rotor from a front of the assembly at a periphery of the sweep area to a rear of the assembly. The peripheral wall 46 along with a pair of end walls 48 which span the peripheral wall at axially spaced positions, partially surround and define an enclosed portion of the rotor contained within the housing. A remaining exposed portion of the rotor projects from the housing for capturing wind currents.

The end walls 48 are situated within close tolerance of the ends of the blades at opposing ends of the sweep area. The free edge of each end wall 48 extends between the front of the assembly at an exiting one of the blades 32 to the shaft along a first portion and subsequently extends rearward from the shaft towards the rear of the assembly at an incline in relation to the first portion of approximately 22.5 degrees. The ends walls 48 thus span circumferentially more then 180 degrees about the shaft at opposing ends of the rotor.

The peripheral wall 46 of the rotor chamber has a greater circumference then the sweep area defined by the rotor itself. The shaft of the rotor is positioned spaced from a radial center of the peripheral wall towards the front of the assembly sufficiently that the exiting one of the blades at the front of the assembly meets the peripheral wall with a close tolerance there between. Radial space between the blades defining the sweep area and the peripheral wall then progressively increases towards the rear of the assembly.

A through port 50 communicates between a point of low pressure in the venturi passage and the enclosed portion of the sweep area near the front of the assembly where the exiting one of the blades has a free edge in close tolerance with the walls. The through port 50 communicates through the peripheral wall so that as air and wind is accelerated through the venturi passage, the resulting acceleration and pressure drop of the wind results in the higher pressure within the rotor chamber being drawn into the lower pressure through port 50, thereby increasing wind turbine efficiency.

One or more ducts 52 are provided in the front of the assembly, each having an inlet 54 facing into the flow direction and an outlet in communication with the enclosed portion of the sweep area of the rotor. The duct 52 tapers in cross-sectional area from the inlet 54 to the outlet 56 such that the outlet defines a nozzle which is directed at an incline towards the trailing face of an exiting one of blades adjacent a free edge of that blade.

A governor 58 is provided which partially surrounds the exposed portion of the rotor diametrically opposite the enclosed portion surrounded by the peripheral walls. The governor 58 generally comprises a scooped body 60 which is pivotally supported adjacent the rear of the assembly onto the housing for movement between respective open and closed positions by a suitable linear actuator 62, for example a hydraulic piston cylinder arrangement. The governor is supported in proximity to the rotor for controlling the flow of air into the rotor chamber.

In the closed position the governor 58 fully surrounds the exposed portion of the rotor so that the rotor is fully shielded and enclosed resulting in wind passing over the housing of the assembly. When pivoted into an open position, the rotor becomes exposed and the scooped body 60 of the governor acts to redirect air currents into the enclosed portion of the sweep area within the rotor chamber at the rear of the assembly.

The housing further includes rudders 64 supported at the ends of the airfoil assemblies 24 to enclose the ends of the venturi passages 12. The rudders 64 are aerodynamic in shape to minimize wind drag. Turning now to the first embodiment as illustrated in FIG. 1 through 5, the rotor is supported for rotation about a horizontal axis in this instance. A vertical support column 70 supports horizontally arranged airfoil assemblies 24 adjacent a top end thereof spaced above the ground. Two airfoil assemblies are provided in this instance including an upper airfoil 72 and a lower airfoil 74. A wide short passage 12 is defined between the airfoils with vertical rudders 64 enclosing the ends of the passage. An auxiliary vertical rudder 76 is supported below the lower airfoil assembly for being oriented in the direction of the wind.

The upper airfoil 72 is symmetrical on top and bottom sides thereof with each of the top and bottom sides curving from a wide curved front edge 78 to a tapered rear edge 79. The rotor is housed within the upper airfoil in this instance along with suitable gear boxes and governor controls. The governor is pivotal on an outer side of the upper airfoil opposite the lower airfoil. The inlet 54 of the duct 52 is located at the front 78 if the upper airfoil.

Figure 4:
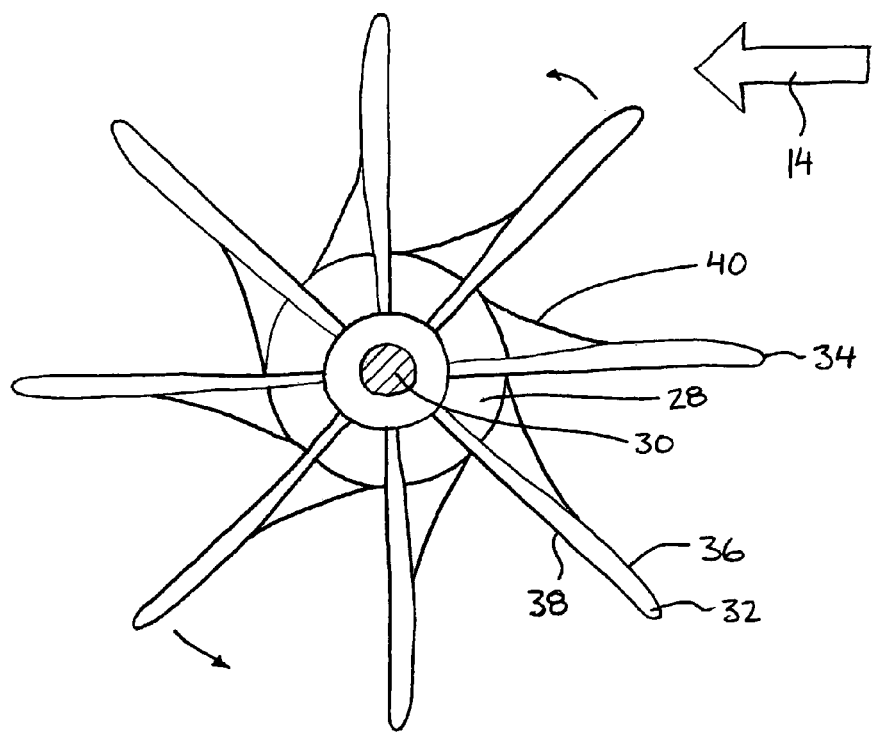
FIGS. 4 and 5 are respective side elevational and top plan views of the rotor housed within the wind turbine assembly.
Figure 5:
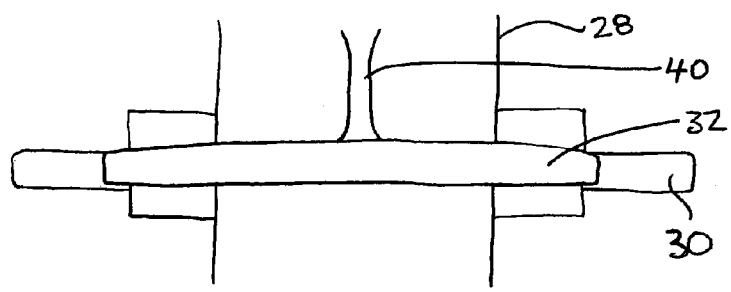

The features of the rotor as illustrated in FIGS. 4 and 5 are common to all embodiments illustrated herein.

Turning now to FIGS. 6 through 9, the second embodiment will now be described herein in further detail. In the second embodiment, the airfoil assemblies 24 are vertically oriented to comprise themselves vertical support columns. On the inner airfoil 80 is provided a pair of symmetrical and opposed curved faces which confront opposing airfoil surfaces of two outer airfoils 82 spaced apart on opposing sides of the inner airfoil 80. One of the venturi passages 12 is defined between each outer airfoil 82 and the inner airfoil 80. The passages 12 are elongate and vertical on opposing sides of the inner airfoil.

The rotor is housed within the inner airfoil 80 adjacent the top end thereof for rotation about a horizontal axis. The through port 50 in communication with the rotor chamber is open to both venturi passages 12 at plural vertically spaced position there along. Likewise, two inlet ducts 52 are proved at spaces positions on the front of the inner airfoil for directing air below the tip of the exiting one of the blades.

The vertical airfoil assemblies are supported on a mechanically rotated base 84 which directs the front of the assembly to face into the direction of oncoming wind. This ensures maximum efficiency.

Figure 10:
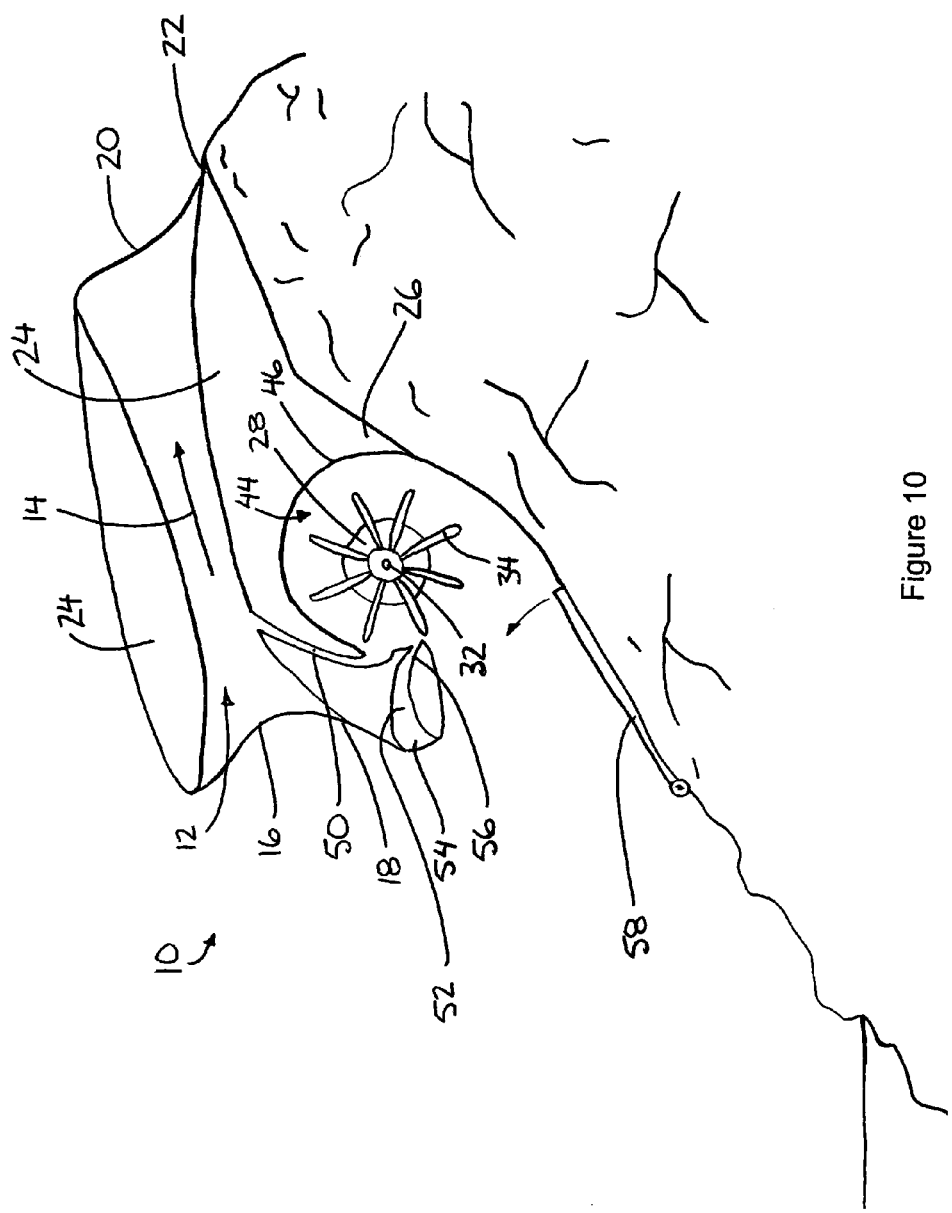
FIG. 10 is a partly sectional side elevational view of a third embodiment of the wind turbine assembly.

Turning now to FIG. 10, the third embodiment of the wind turbine assembly 10 is illustrated. The housing in this instance is supported in a coastal land mass for receiving ocean wind currents. The airfoils are horizontally arranged for defining an elongate and horizontal venturi passage 12. The rotor is supported in a lower most one of the airfoil assemblies 24 in this instance with the governor 58 comprising a gate which is movable between the ground and the lower most one of the airfoils.

Figure 11:
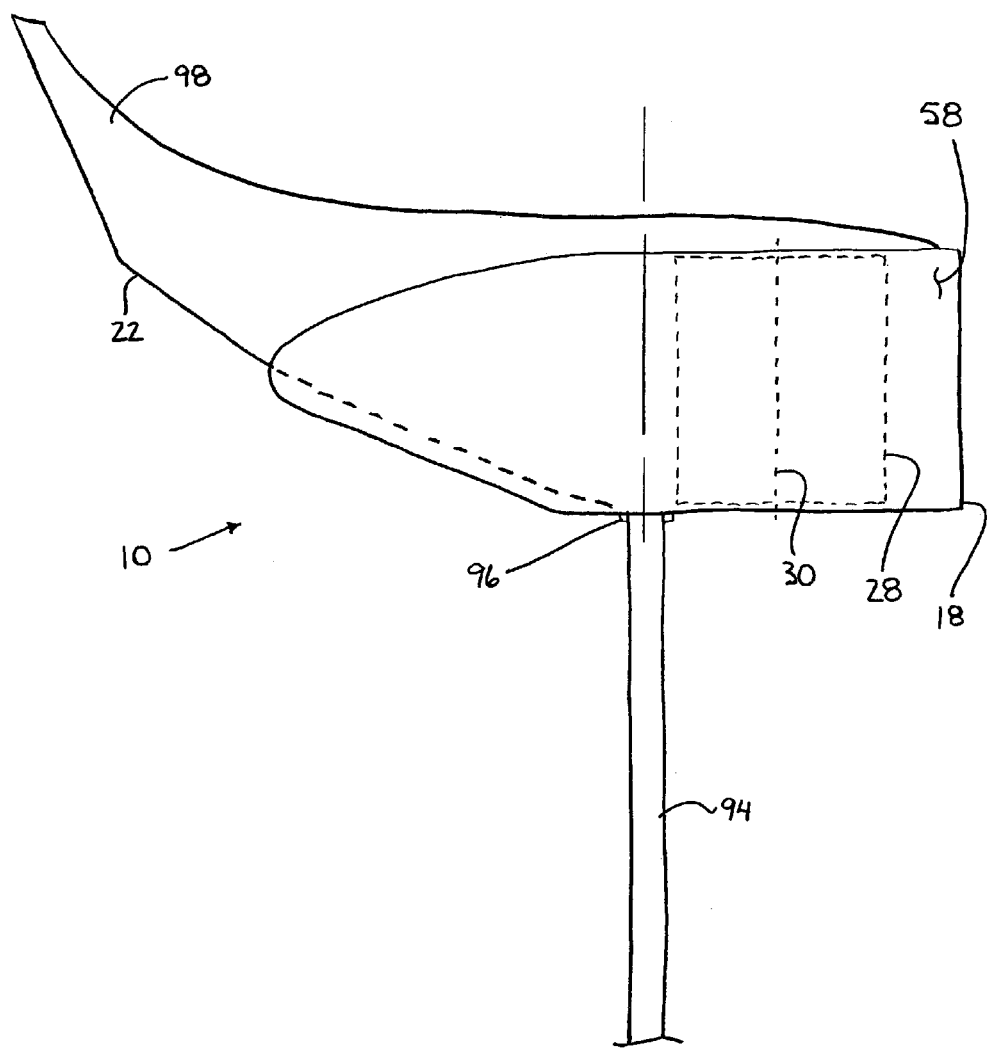
FIG. 11 and FIG. 12 are respective a side elevational and front elevational views of a further embodiment of the wind turbine assembly.
Figure 12:
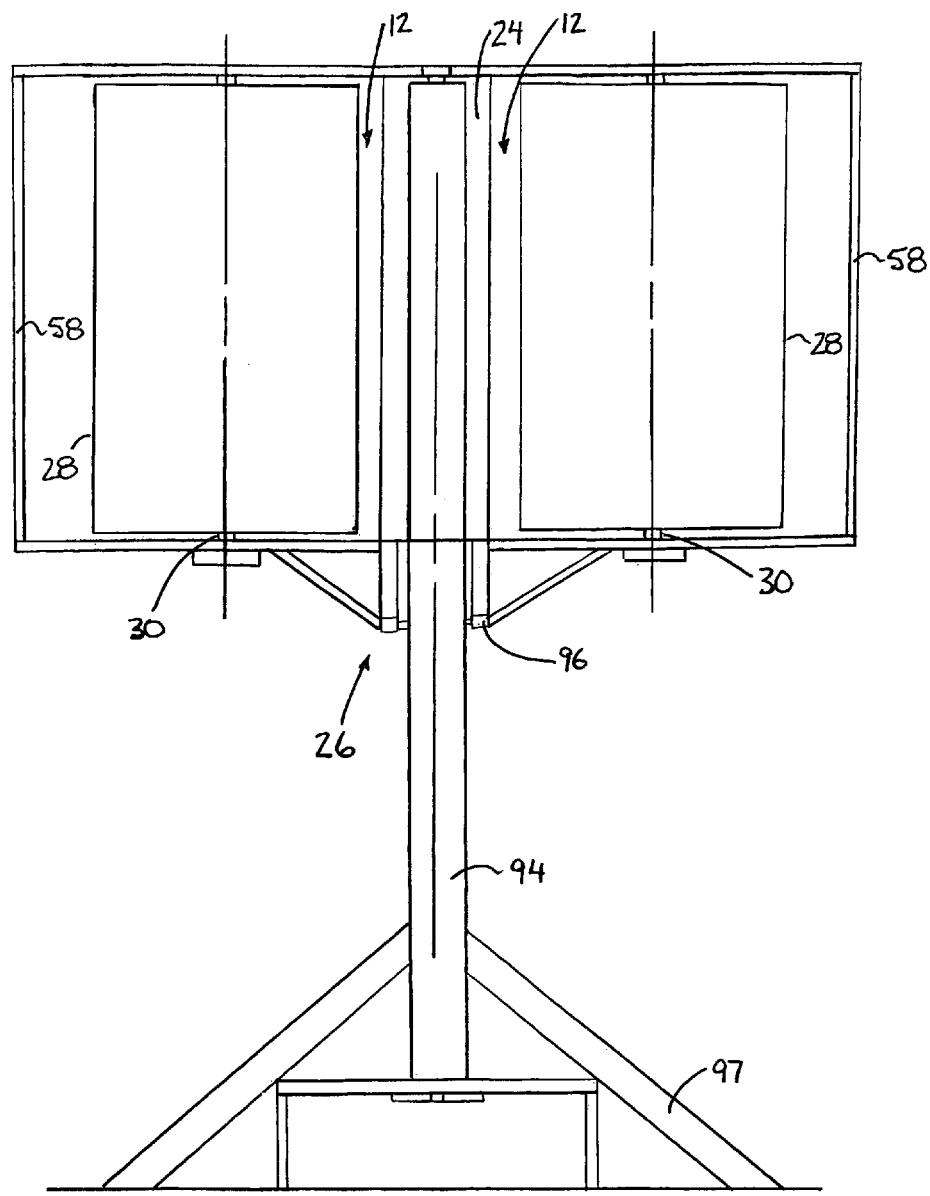
Figure 13:
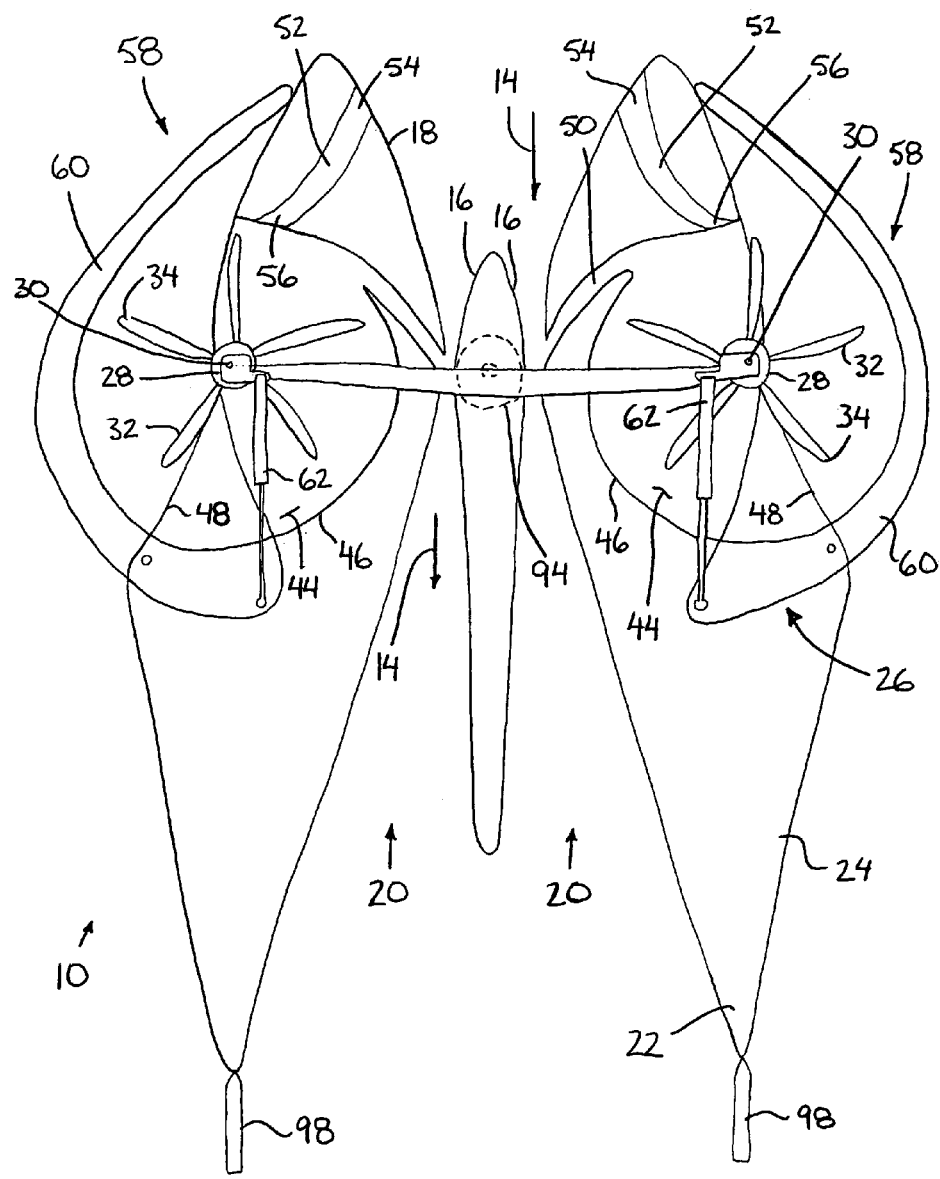
FIG. 13 is a partly sectional top plan view of the wind turbine assembly according to FIGS. 11 and 12.

As illustrated in FIG. 11 through 13, the fourth embodiment of the turbine assembly 10 is illustrated in which a pair of rotors 28 are provided for rotation about respective vertical axes. The airfoil assemblies 24 are vertically oriented in this instance to defined vertical venturi passages 12 between the rotors. Two large outer airfoils 90 are provided which house the rotors 28 respectively therein. The exposed portion of each rotor is on an external side of the respective outer airfoil. Accordingly, the governors 58 associated with the rotors respectively are on opposing sides of assembly from one another for directing the air flow internally towards the rotors.

An inner airfoil 92 is supported between the outer airfoils so as to define one venturi passage 12 between each outer airfoil 90 and the inner airfoil 92. As in previous embodiments, the through port 50 communicates between each rotor and the respective venturi passage 12 in closest proximity thereto. The duct 52 is provided on each outer airfoil for communication with the respective rotor similarly to previous embodiments.

The housing 26 along with the airfoil assemblies and the rotors supported thereon, are all supported rotatably on a vertical column 94 by suitable bearings 96. The column 94 includes suitable bracing 97 for supporting the assembly in a vertical orientation. The housing includes a pair of tail rudders 98 extending rearwardly from the outer airfoil assemblies respectively. The tail rudders extend radially outward from the column 94 a distance which is much greater than the rotors. The pair of spaced apart rotor shafts 30 and the column are parallel and located in a substantially common plane with an axis of rotation of the housing 26 about the column 94. The tail rudders 98 ensure that the front 18 of the assembly faces into the wind as they are the most rearward components of the assembly and the assembly is freely rotatable about the column 94 so that wind forces acting on the rail rudders rotate the assembly until the front of the assembly faces into the wind.

As noted above, FIG. 1 shows a horizontal venturi, perpendicular vane wind turbine. This is a smaller, self-directing turbine that, for example, could be used for aeration of ponds or for charging batteries with an A/C alternator.

Figure 2:
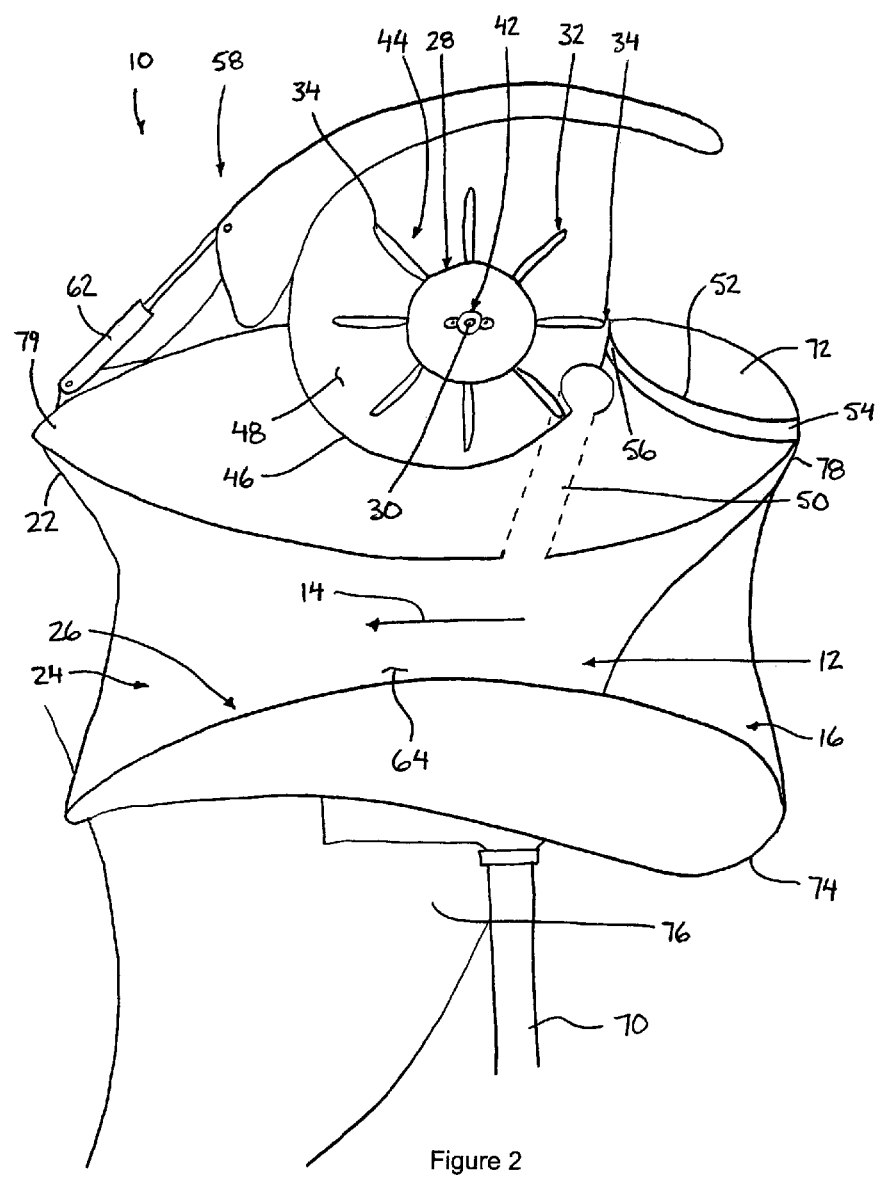
FIG. 2 is a partly sectional side elevational view of the assembly according to FIG. 1.

FIG. 2 shows airflow through the machine and its arrangement of working components. The governor is shown about half open and directing the air-stream down the back of the rotor chamber. As the air-stream accelerates through the venturi, a low-pressure area is created on the lower surface of the upper airfoil. This low pressure is transferred to the rotor chamber by the port. Because this low-pressure area is present on the backsides of each rotor blade, high-pressure air from the wind stream can push the blades through the full rotation of the rotor. This is the same principle that can lift an 800,000-pound aircraft off the ground.

Figure 3:
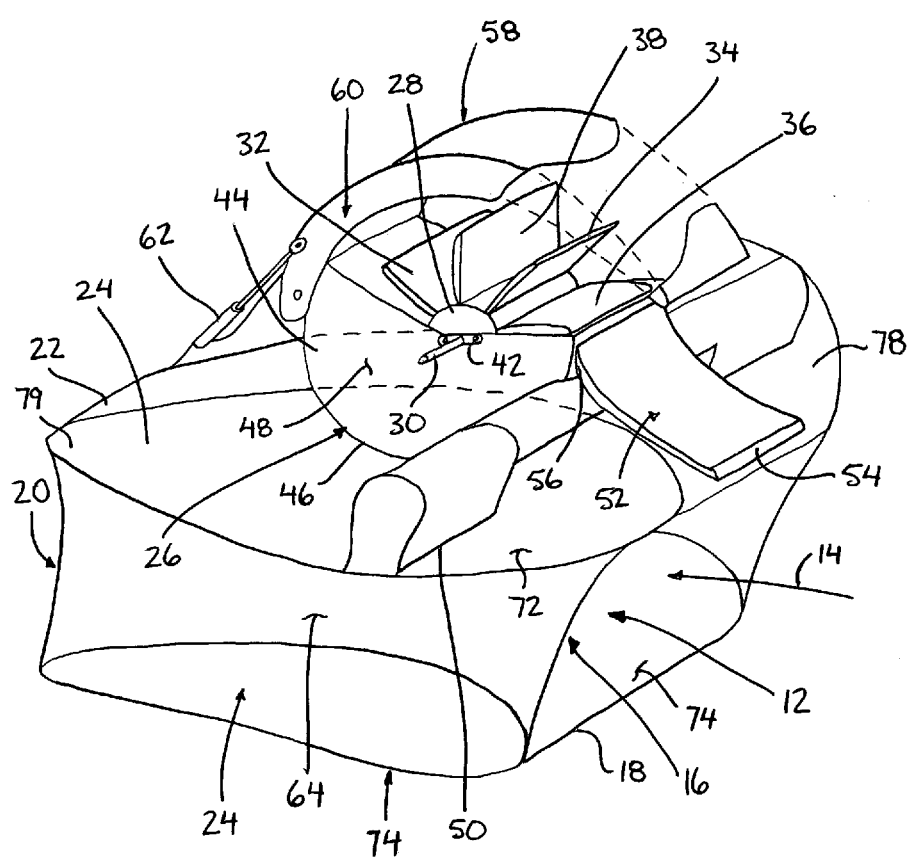
FIG. 3 is a partly sectional perspective view of the first embodiment of the wind turbine assembly.

FIG. 3 shows the rotor and the rotor chamber arrangement and how it is positioned within the upper airfoil. It also shows the relationship to the position of the venturi ports to the upper airfoil. The image also shows a cutaway view of the governor and how it is positioned over the rotor assembly when in the closed position. The image shows the frontal duct and its relationship to the front of the rotor chamber.

FIG. 4 shows how additional gussets can be added behind the rotor blade to transfer the load down to the rotor shaft. The image depicts the shape of the rotor blade that is required to create lift on the leading horizontal blade.

FIG. 5 illustrates the width and height of the blade which can be any dimension desired as long as it is in proportion to the venturi that is being used.

Figure 6:
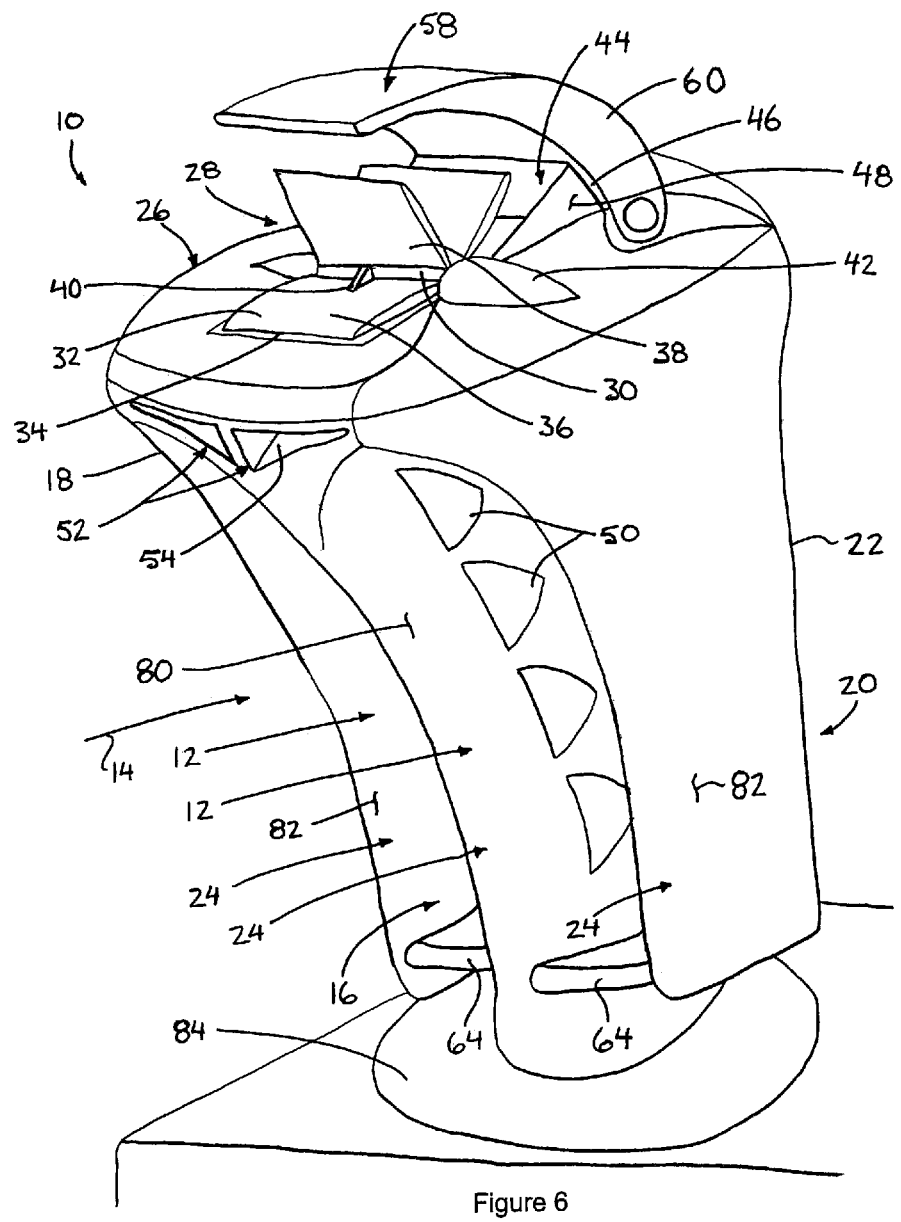
FIG. 6 is a perspective view of a second embodiment of the wind turbine assembly.

FIG. 6 illustrates an assembly is mechanically directed into the wind stream. It is intended to be very large and drive huge generators and hydraulic or pneumatic pumps.

Figure 7:
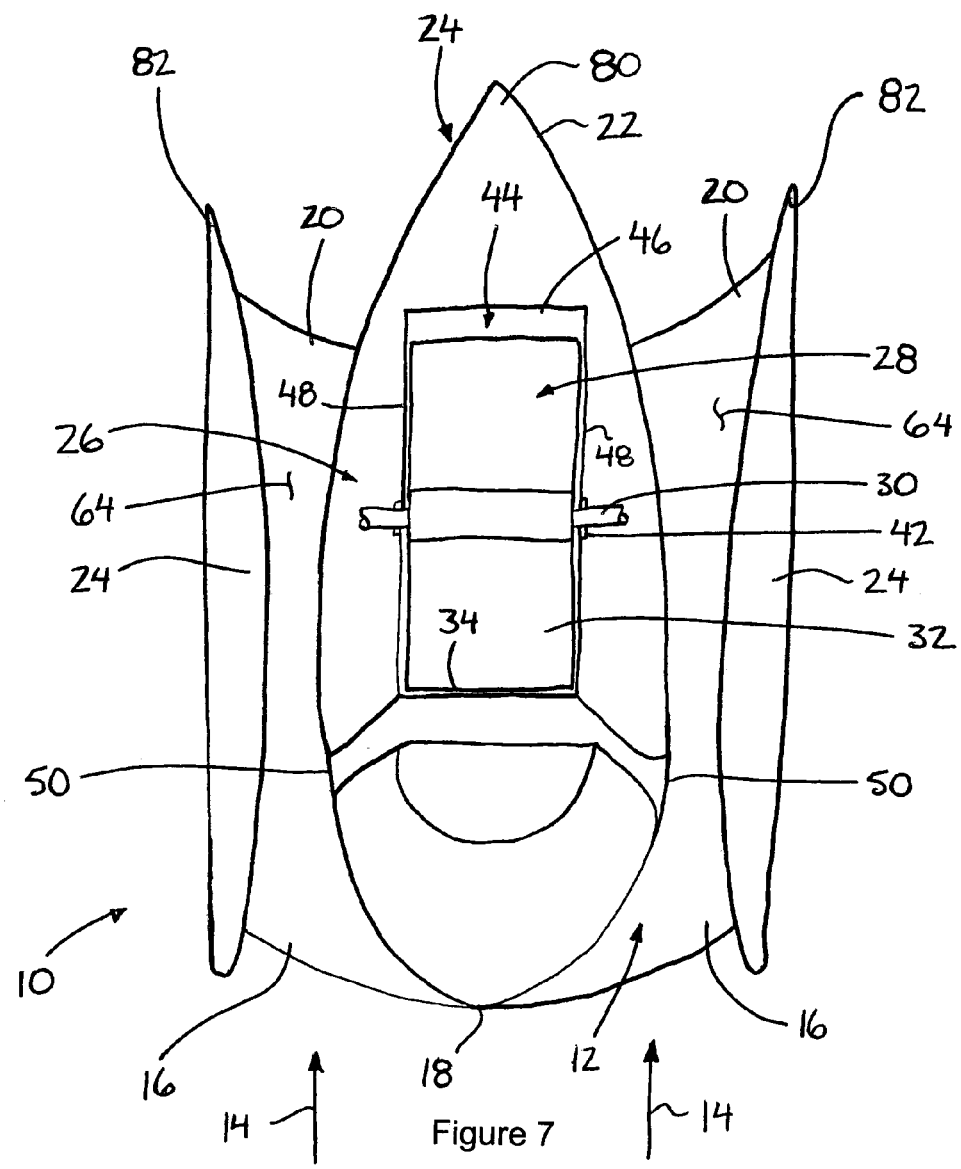
FIGS. 7 and 8 are partly sectional top plan and side elevational views of the assembly according to FIG. 6.

FIG. 7 shows the relationship between the inner airfoil and the outer airfoils. A venturi is created on each side of the inner airfoil. The arrows represent the airflow through the machine. The image shows the relationship of the rotor/chamber arrangement to the inner airfoil. The image shows the venturi ports relationship to the surface of the inner airfoil.

Figure 8:
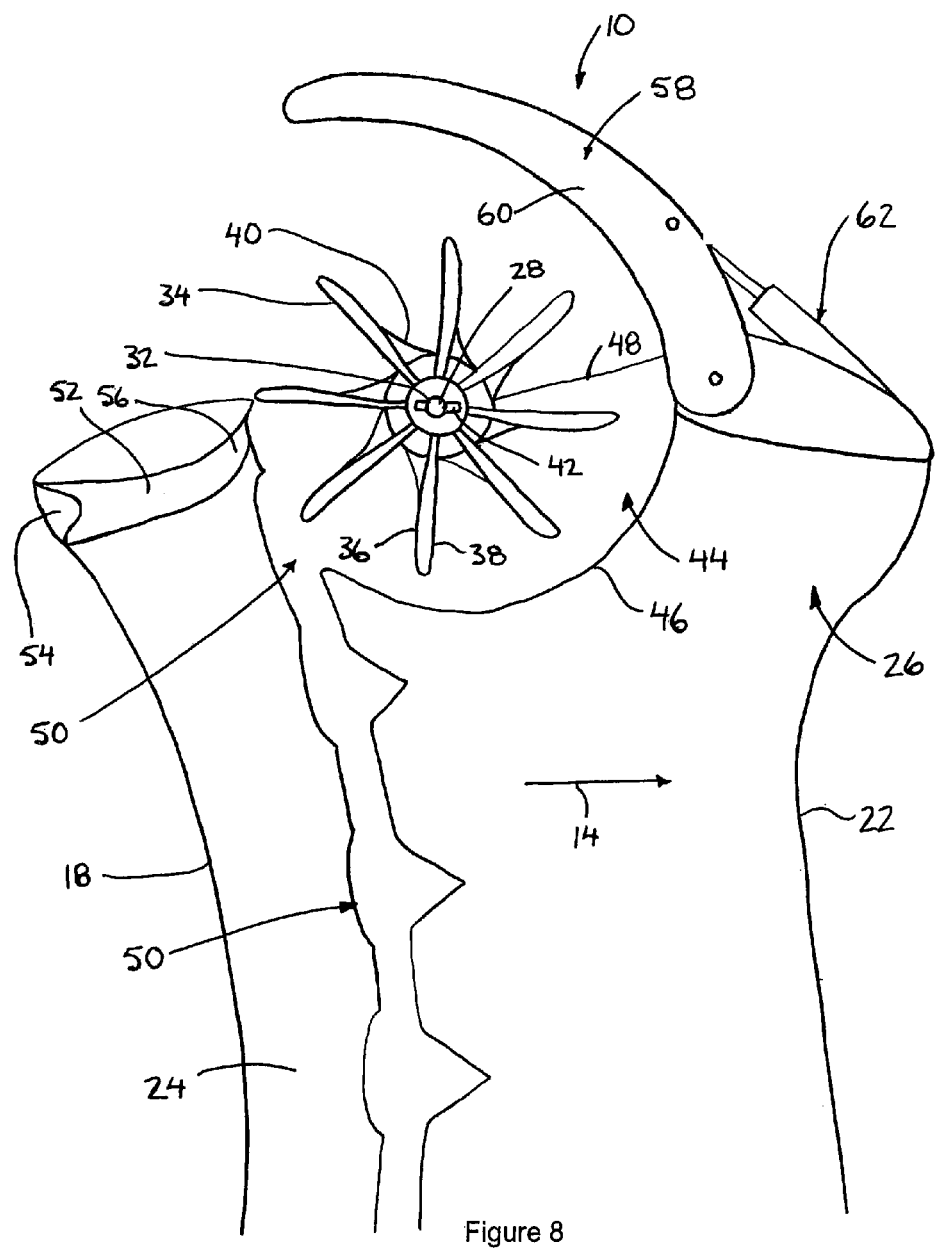

FIG. 8 shows the relationship of the outer airfoils and how they are arranged to the inner and upper airfoils. The image shows the lower support gussets and how they are positioned on the machine. The frontal ports are also shown in relation to the upper airfoil.

Figure 9:
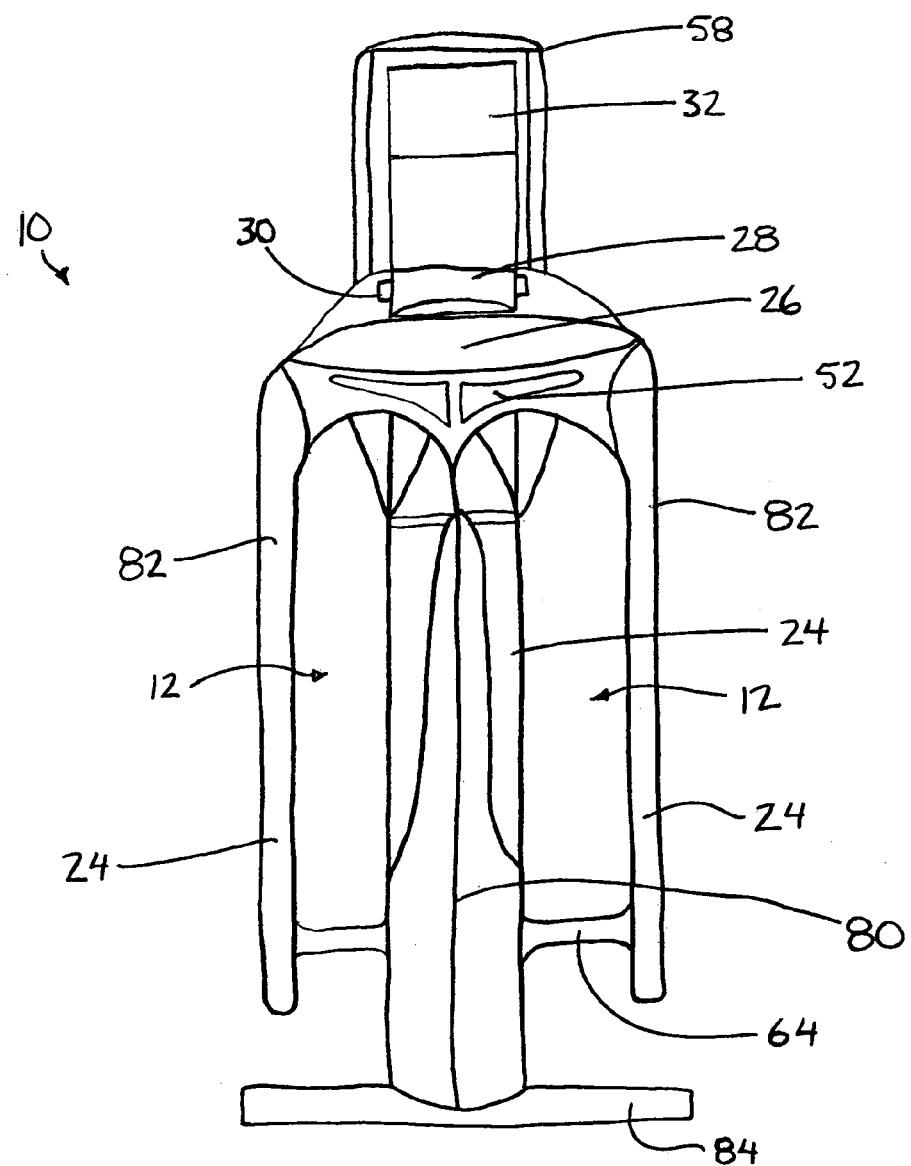
FIG. 9 is a front elevational view of the second embodiment of the wind turbine assembly.

FIG. 9 shows the relationship between the rotor chamber assembly and the venturi ducts that run vertically within the inner airfoil. The outer airfoils are not shown for clarity. The image shows the frontal ports and their relationship to the front of the rotor chamber. The image shows the governor in an open position. The image shows the linear actuator that controls the governors' movement. In this machine the actuator would be hydraulic, run by a pump driven off one of the output shafts.

FIG. 10 is a perspective view of a horizontal venturi generating station design applied to capture coastal winds along ocean fronts. The structure is integrated into the mountain slope and takes advantage of the cold air rushing toward the mainland to replace the heated uprising air. This concept can be used to generate great amounts of electricity in a similar fashion as a hydroelectric dam.

The basic theory of operation of the wind turbine assembly and how it can be applied in various applications will now be described in the following. The most efficient way to capture the energy in the wind is to have a rotor blade that's square to the air streams circumferential direction of flow. The problem, until now, has been to apply this wind force throughout the full rotation of the wind turbine rotor.

The basic principle behind the fixed blade rotor and the rotor chamber is to provide a means to push the top blades in the direction of the air stream and to pull the bottom blades back against the direction of flow. The rotor, which has fixed blades perpendicular to a circumferential flow direction through the rotor chamber, is housed in the rotor chamber slightly ahead of the chambers center point. The top of the rotor is exposed to the air stream. The wind stream is guided towards the blades by the upper airfoils top surface.

The front of the rotor chamber is connected to a venturi by ducts or a series of ducts. Forcing the wind stream through two airfoils that are inverted to each other, either vertically or horizontally, creates the venturi. This design uses the same principle that can lift an 800,000-pound aircraft off the ground. A low-pressure area is created on the surface of the airfoil as the wind is accelerated through the venturi. By connecting the front of the rotor chamber into this low-pressure area, it allows the rotor blades to be pushed by the high-pressure air throughout the full rotation of the rotor.

In a vertical venturi design, the height of the support tower can create the venturi. The tower can be several meters tall, which in turn can create massive amounts of energy.

Additional force is applied to the rotor blades in the front portion of the rotor chamber between the venturi and the upper airfoil surface. Frontal ducts direct the high-pressure air stream under the tip of the exiting rotor blade. Because of the curvature of the rotor blades, a low-pressure area is also created on the top surface of the exiting blade as the air stream passes over it when the blade is in the leading position. The high-pressure air that is directed under this blade provides lift as it exits the rotor chamber. The air stream then catches the under surface of the blade and pushes it through the rest of the rotation up to the venturi port.

The governor, which extends above the rotor chamber, adds substantial power to the wind turbine when it is in the open position. It captures the air-stream and guides it down the back of the rotor chamber providing additional push on the rotor blades. Even when in the fully open position, there is little stress load on the governor structure. Because of the angle of attack of the leading edge of the governor, the wind stream does not catch the governor and pull it back. Also, due to the low-pressure area that is created by the venturi in the rotor chamber, the air stream is "pulled" down the governor's surface. When in the closed position, the governor simply guides the air stream over the machine without resistance.

The governor provides protection to the rotor and rotor chamber during periods of high wind, freezing rain and times of heavy snowfall with light winds. It also provides an enclosure during periods of maintenance and inspection of the machine. Because the governor allows the wind to pass over the machine during high winds, there is no stress applied to the rotor blades because we do not have to "brake" against the wind flow. There is also no stress on the structure itself. The air stream merely passes through the machine. The energy is applied only to the rotating rotor assembly and therefore little noise is created. Noise is essentially wasted energy in a wind turbine. It can be compared to heat that is created in an electrical circuit when a resistor is placed in a circuit.

The design of this wind turbine allows for high inertia speeds of the rotor assembly. This is beneficial to help stabilize rotor speeds during wind speed fluctuations. The design also allows for substantially large rotor blades that can capture the force of the wind.

The rotor has two output shafts, which can be utilized in various configurations to drive different apparatuses. Large units have the ability to run two generators, alternators, hydraulic pumps, air pumps or water pumps. The largest vertical venturi turbines are intended to be directed into the wind stream by mechanical means and controlled by computer logic. Manufacturers can take into account factors such as: wind speed, power demand, weather conditions, and any other controlling factors.

An ideal use for the wind turbine is in the development of a coastal wind generating station. FIG. 10 shows a concept drawing of this device being used to capture winds along the coastline. The turbines can be fixed into the coastal mountains to take advantage of the existing structure of the mountain slope and the consistent flow of wind moving inland from the ocean.

As noted in the above description, numerous advantages of the present wind turbine design can be realised as will now be described in further detail.

A fixed blade design means no moving parts other than the turning rotor, governor and the support structure that must face the direction of the wind stream.

The blades remain perpendicular to the flow of the wind at all times. This is the most efficient wind turbine possible.

Force is exerted to up to 93% of the circumference of the rotor even without the frontal porting.

Frontal porting directs high-pressure air under the tip of blade exiting the rotor chamber. Because the blade is shaped like an airfoil, a low-pressure area is created on top of the blade as air passes over it. This will create additional lift on the blade as it enters the air stream.

The design of the wind turbine provides the ability to make the rotor blades as wide or as long as needed. Structural gussets can be added behind the blade to transfer the load to the rotor shaft without compromising the efficiency of the design.

A high inertia rotor stabilizes rotor speed during wind speed fluctuations.

The support structure has very little resistance against the flow of the wind. Because the design uses aerodynamics to maximize the energy taken from the air stream and directly transfers it to the rotation of the rotor, there is little stress load on the structure itself.

Because there is little resistance on the structure itself, there is very little noise created. Noise in a wind machine can be compared to a resistor in an electrical circuit. During flow of electricity in the circuit, the resistor creates heat. This heat is wasted energy. Noise is the wasted energy in a wind turbine. If a turbine blade resists the flow of energy from the wind, it creates noise. This turbine turns in direct proportions with the flow of the wind, which means there is very little wasted energy.

Governing is achieved by closing the upper section of the rotor chamber. During extreme high winds, the governor can close completely. This allows the wind to pass easily over the rotor structure. There is no need for braking and no stress on the rotor blades when they are not in use or when service is being performed on the machine.

The venturi can be a horizontal or a vertical design. The vertical design is advantageous because of the size of the venturi that can be created. The total height of the support tower can become the venturi.

Various airfoil shapes and designs can be utilized to maximize the lowest pressure possible in the venturi port.

Various curvatures of the rotor blade can be used to maximize the efficiency of the rotor and reduce drag of the blades as they turn within the rotor chamber.

The upper airfoil provides ample room to house alternators, generators and other control equipment.

Two outputs at respective ends of the shaft allow for various drive configurations.

This design supports capturing coastal winds. Huge rotor assemblies can be fixed into mountainsides and carving through the mountain slope can form the venturi. Massive amounts of energy can be produced from these daily re-occurring winds While various embodiments of the present invention have been described in the foregoing, it is to be understood that other embodiments are possible within the scope of the invention. The invention is to be considered limited solely by the scope of the appended claims.

The invention claimed is:

1. A wind turbine assembly comprising:
   a venturi passage extending in a flow direction from a front opening at a front of the assembly to a rear opening at a rear of the assembly, the venturi passage being defined between confronting airfoil surfaces of respective airfoil assemblies;
   a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;
   a peripheral wall which extends at least 180 degrees about the rotor in a generally circumferential direction from the front of the assembly at an outer periphery of the sweep area towards the rear of the assembly to partially surround and define an enclosed portion of the sweep area; and a through port communicating through the peripheral wall between the enclosed portion of the sweep area near the front of the assembly and the venturi passage.

2. The assembly according to claim 1 wherein each blade spans outwardly generally parallel to the shaft from a trailing side attached to the shaft to a leading side at a free edge of the blade spaced from the shaft and each blade has a profile between leading and trailing sides which is generally in the shape of an airfoil.

3. The assembly according to claim 1 wherein each blade remains in a fixed position in relation to the shaft, oriented such that substantially a complete surface of the blade remains perpendicular to a circumferential flow direction about the shaft as the rotor is rotated.

4. The assembly according to claim 1 wherein each blade includes a leading face facing into a direction of rotation of the rotor and a trailing face opposite the leading face, the leading and trailing faces of each blade being identically shaped to the respective leading and trailing faces of the other blades.

5. The assembly according to claim 1 wherein the peripheral wall has a circumference which is larger than a circumference of the rotor, defining a space therebetween and wherein the shaft of the rotor is spaced towards the front of the assembly from a radial centre of the peripheral wall.

6. The assembly according to claim 1 wherein an exposed portion of the sweep area diametrically opposite the peripheral wall is open and exposed to wind currents blowing past the assembly.

7. The assembly according to claim 1 wherein one of the airfoil assemblies is equal in curvature on both surfaces spanning between a leading edge and a trailing edge thereof, in which the leading edge is widest for facing into the wind, said one of the airfoil assemblies supporting the rotor therein.

8. The assembly according to claim 1 wherein the through port communicates with the venturi passage at a point of lowest pressure created by an air stream being accelerated as it passes through the venturi passage.

9. The assembly according to claim 1 wherein there is provided a governor supported in proximity to the rotor diametrically opposite the peripheral wall for controlling flow of air directed into the rotor.

10. The assembly according to claim 9 wherein the governor is movable between a closed position in which the rotor is enclosed and shielded from the wind and an open position in which wind is redirected down into the enclosed portion of the sweep area at the rear of the assembly.

11. A wind turbine assembly comprising:

a venturi passage extending in a flow direction from a front opening at a front of the assembly to a rear opening at a rear of the assembly, the venturi passage being defined between confronting airfoil surfaces of respective airfoil assemblies;

a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;

a peripheral wall which extends at least 180 degrees about the rotor in a generally circumferential direction from the front of the assembly at an outer periphery of the sweep area towards the rear of the assembly to partially surround and define an enclosed portion of the sweep area, the peripheral wall having a circumference which is larger than a circumference of the rotor, defining a space therebetween; and a through port communicating through the peripheral wall between the enclosed portion of the sweep area near the front of the assembly and the venturi passage;

wherein the shaft of the rotor is spaced towards the front of the assembly from a radial centre of the peripheral wall such that the space defined between the rotor and the peripheral wall progressively gets smaller in the direction of rotation towards the front of the assembly.

12. The assembly according to claim 11 wherein the venturi passage is defined between confronting airfoil surfaces of respective airfoil assemblies.

13. A wind turbine assembly comprising:

a venturi passage extending in a flow direction from a front opening at a front of the assembly to a rear opening at a rear of the assembly, the venturi passage being defined between confronting airfoil surfaces of respective airfoil assemblies;

a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;

a peripheral wall which extends at least 180 degrees about the rotor in a generally circumferential direction from the front of the assembly at an outer periphery of the sweep area towards the rear of the assembly to partially surround and define an enclosed portion of the sweep area; and a through port communicating through the peripheral wall between the enclosed portion of the sweep area near the front of the assembly and the venturi passage;

wherein the enclosed portion of the sweep area is bound at opposing ends by end walls having a close tolerance with respective ends of the blades.

14. The assembly according to claim 13 wherein the end walls terminate at a respective edge extending in the flow direction from the shaft of the rotor to the front of the assembly and the end walls span greater than 180 degrees about the shaft.

15. The assembly according to claim 13 wherein there is provided a close tolerance between the peripheral wall and a free edge of an exiting one of the blades at the front of the assembly.

16. A wind turbine assembly comprising:

a venturi passage extending in a flow direction from a front opening at a front of the assembly to a rear opening at a rear of the assembly, the venturi passage being defined between confronting airfoil surfaces of respective airfoil assemblies;

a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;

a peripheral wall which extends at least 180 degrees about the rotor in a generally circumferential direction from the front of the assembly at an outer periphery of the sweep area towards the rear of the assembly to partially surround and define an enclosed portion of the sweep area;

a through port communicating through the peripheral wall between the enclosed portion of the sweep area near the front of the assembly and the venturi passage; and at least one duct communicating from an inlet facing into the flow direction to an outlet directed into the enclosed portion of the sweep area at the front of the assembly.

17. The assembly according to claim 16 wherein the outlet of said at least one duct is directed at a trailing face of an exiting one of the blades of the rotor adjacent a free edge of said exiting one of the blades.

18. The assembly according to claim 16 wherein said at least one duct tapers progressively smaller from the inlet to the outlet.

19. A wind turbine assembly comprising:

a venturi passage extending in a flow direction from a front opening at a front of the assembly to a rear opening at a rear of the assembly, the venturi passage being defined between confronting airfoil surfaces of respective airfoil assemblies;

a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;

a peripheral wall which extends at least 180 degrees about the rotor in a generally circumferential direction from the front of the assembly at an outer periphery of the sweep area towards the rear of the assembly to partially surround and define an enclosed portion of the sweep area; and a through port communicating through the peripheral wall between the enclosed portion of the sweep area near the front of the assembly and the venturi passage;

wherein the venturi passage is defined by vertically arranged airfoils supporting the rotor thereabove.

20. A wind turbine assembly comprising:

a venturi passage extending in a flow direction from a front opening at a front of the assembly to a rear opening at a rear of the assembly, the venturi passage being defined between confronting airfoil surfaces of respective airfoil assemblies;

a rotor including a shaft supported for rotation in proximity to the venturi passage about a longitudinal axis of the rotor which lies substantially perpendicular to the flow direction of the venturi passage and a plurality of blades extending radially from the shaft for rotation therewith to define a sweep area occupied by the blades as the rotor is rotated about the longitudinal axis of the rotor;

a peripheral wall which extends at least 180 degrees about the rotor in a generally circumferential direction from the front of the assembly at an outer periphery of the sweep area towards the rear of the assembly to partially surround and define an enclosed portion of the sweep area;

a through port communicating through the peripheral wall between the enclosed portion of the sweep area near the front of the assembly and the venturi passage; and a direction mechanism for orienting the front of the assembly to face into a direction of the wind.

* * * * *